(12) United States Patent
Krishnamurthy et al.

(10) Patent No.: US 9,918,141 B2
(45) Date of Patent: Mar. 13, 2018

(54) SYSTEM AND METHOD FOR MONITORING AND DETECTING TELEVISION ADS IN REAL-TIME USING CONTENT DATABASES (ADEX REPORTER)

(71) Applicant: SUREWAVES MEDIATECH PRIVATE LIMITED, Bangalore (IN)

(72) Inventors: Kishore Adekhandi Krishnamurthy, Bangalore (IN); Roopak Arayakkandi Nelliat, Bangalore (IN)

(73) Assignee: SUREWAVES MEDIATECH PRIVATE LIMITED, Karnataka (IN)

(*) Notice: Subject to any disclaimer, the term of this patent is extended or adjusted under 35 U.S.C. 154(b) by 0 days.

(21) Appl. No.: 15/230,350

(22) Filed: Aug. 5, 2016

(65) Prior Publication Data
US 2017/0041684 A1   Feb. 9, 2017

(30) Foreign Application Priority Data

Aug. 5, 2015   (IN) .......................... 2842/CHE/2015

(51) Int. Cl.
*H04H 60/32*   (2008.01)
*H04N 21/81*   (2011.01)
(Continued)

(52) U.S. Cl.
CPC ....... *H04N 21/812* (2013.01); *G06F 17/3002* (2013.01); *G06F 17/30026* (2013.01);
(Continued)

(58) Field of Classification Search
CPC ...... G06F 17/30; H04N 21/24; H04N 21/434; H04N 21/4341; H04N 21/4343; H04N 21/439; H04N 21/4394; H04N 21/44008; H04N 21/442; H04N 21/44204; H04N 21/4415; H04N 21/454; H04N 21/233; H04N 21/23418; H04N 21/23424; H04N 21/23524; H04N 21/43; H04N 21/4312; H04N 21/4345; H04N 21/812; H04N 21/8456
USPC .......................................... 725/14
See application file for complete search history.

(56) References Cited

U.S. PATENT DOCUMENTS 6,633,651 B1* 10/2003  Hirzalla ............. G06K 9/00711
                                                 382/100
6,766,523 B2*  7/2004  Herley ................... H04H 60/56
                                                 725/18

(Continued)

*Primary Examiner* — Michael B Pierorazio
(74) *Attorney, Agent, or Firm* — Barry Choobin; Patent 360 LLC

(57) ABSTRACT

The embodiments herein provide a system and method for monitoring and detecting Television (TV) ads in real-time using content databases. The method comprises an ingest process and a lookup process. An audio stream of an ad is chopped into predetermined timeframe samples. The chopped samples are stored in an ingest database. A TV broadcast stream of predefined length is chopped into samples which are compared with the ingest database. When the threshold value of a candidate is more than an average value, the candidate is shortlisted for further filtrations. Then the TV broadcast stream is compared with contents of an additional database. The additional database stores the whole length of an ingested ad without any chopping. A shifted search is performed on short listed candidates to detect the version of the ad played in the TV channel.

9 Claims, 3 Drawing Sheets

(51) Int. Cl.
*G06F 17/30* (2006.01)
*G06Q 30/02* (2012.01)
*H04N 21/233* (2011.01)
*H04N 21/234* (2011.01)
*H04N 21/845* (2011.01)

(52) U.S. Cl.
CPC ... *G06F 17/30743* (2013.01); *G06Q 30/0242* (2013.01); *H04N 21/233* (2013.01); *H04N 21/23418* (2013.01); *H04N 21/8456* (2013.01)

(56) References Cited

U.S. PATENT DOCUMENTS

| | | | | |
|---|---|---|---|---|
| 7,194,752 | B1 * | 3/2007 | Kenyon | G10L 25/48 382/118 |
| 7,818,167 | B2 * | 10/2010 | Kim | G06F 17/30743 704/200.1 |
| 8,868,223 | B1 * | 10/2014 | Sharifi | G01S 5/24 700/94 |
| 9,258,604 | B1 * | 2/2016 | Bilobrov | H04N 21/4586 |
| 9,390,167 | B2 * | 7/2016 | Mont-Reynaud | G06F 17/30743 |
| 9,503,778 | B2 * | 11/2016 | Kitazato | H04N 21/4383 |
| 9,612,791 | B2 * | 4/2017 | Yi | G06F 17/30743 |
| 9,740,696 | B2 * | 8/2017 | Oztaskent | G06F 17/30023 |
| 2009/0074235 | A1 * | 3/2009 | Lahr | G06F 17/30799 382/100 |
| 2012/0269440 | A1 * | 10/2012 | Miyano | G06K 9/00248 382/190 |
| 2013/0318071 | A1 * | 11/2013 | Cho | G06F 17/3074 707/722 |
| 2014/0253791 | A1 * | 9/2014 | Koskinen | H04N 5/232 348/362 |
| 2016/0127755 | A1 * | 5/2016 | Woods | H04N 21/2665 725/19 |
| 2017/0041684 | A1 * | 2/2017 | Krishnamurthy | H04N 21/812 |

* cited by examiner

SYSTEM AND METHOD FOR MONITORING AND DETECTING TELEVISION ADS IN REAL-TIME USING CONTENT DATABASES (ADEX REPORTER)

CROSS-REFERENCE TO RELATED APPLICATIONS

This application claims the priority of the Indian Provisional Patent Application with the number 2842/CHE/2015 and entitled "A System and Method for Monitoring and Detecting Television Ads in Real-Time Using Content Databases (Adex Reporter)" filed on Jun. 5, 2015 and subsequently postdated to Aug. 5, 2015 by two months, and the contents of which are included in its entirety as reference herein.

BACKGROUND

Technical Field

The embodiments herein are generally related to media monitoring services. The embodiments herein are particularly related to a system and method for monitoring and detecting Television (TV) advertisements (ads) in real-time using content databases. The embodiments herein are more particularly related to a system and method for accurately measuring boundaries, such as start and end time, date of airing, and versions (such as short or long versions) and further of an advertisement in a TV broadcast stream.

Description of the Related Art

The growth of television in the developing world over the last two decades is extraordinary. Television continues to be the largest medium for delivering information in an effective manner to a large captive audience at the right time. Beyond providing entertainment, television vastly increases both the availability of information about the outside world and exposure to other ways of life through advertisements or commercials. Advertisements are a part of daily life and certainly an important part of entertainment programming.

On the other hand, advertisements form an important revenue stream for product owners or companies. Hence, companies or manufacturers have started increasingly spending a larger percentage of their expenses on TV advertisements. When a company buys advertising space or time from a media seller, the company includes specific instructions in regards to when and how the advertisement is broadcasted in TV channels.

In the past half-century, many systems have been developed for monitoring and detecting advertisements from broadcast TV video signals. In the beginning, monitoring is done by human beings where a person visually searches a tape or other records for detecting the advertisements. Later, automated systems are introduced for monitoring and detecting advertisements in real-time. In these systems, initially TV broadcast stream is recorded as an array of long video files. The video files are compared to the specified sample reference video, such as the commercial or advertisements that are to be tracked. When a match between the two video files is detected, the system records the information such as time, date, and TV channel name on which the advertisement is aired and so on. Further, recorded information is provided to the advertisement owners for their reference.

The existing technologies do not ensure accuracy while detecting the ads. As a result, the boundaries (such as start time and end time, date of airing) of the advertisements are not accurately determined in the information extracted from the system. Also, these systems fail to detect an ad when the ad contains silence during its play in the TV channels. For example, the duration of silence in a 20 seconds ad is 14 seconds. When a TV broadcast stream of 10 seconds is compared with this ad sample, the existing systems fail to detect the ad or the detections are fault.

In some cases, companies opt to broadcast an ad in different lengths of contents like long and short versions for effectively generating brand awareness among the audience. For analyzing campaign effectiveness, the version of the ad played is to be identified by the system.

Hence there is a need for a system and method for accurately measuring boundaries (such as start time, end time, date of airing) of the advertisement in a TV broadcast stream. There is also a need for a system and a method for detecting the boundaries of an ad in a TV broadcast stream even when the ad contains silence during its play in the TV channels. There is also a need for a system and a method for identifying the version of an ad played in a TV broadcast stream when the ad has different versions of contents like ads with short length and long length.

The above mentioned shortcomings, disadvantages and problems are addressed herein and which will be understood by reading and studying the following specification.

OBJECT OF THE EMBODIMENTS HEREIN

The primary object of the embodiments herein is to provide a system and method for monitoring and detecting Television (TV) ads in real-time using content databases.

Another object of the embodiments herein is to provide a system and method for accurately measuring boundaries (start time and end time, date of airing) of an advertisement in a TV broadcast stream.

Yet another object of the embodiments herein is to provide a system and method for effectively detecting an ad in a TV broadcast stream even when the ad contains silence during its play in the TV channels.

Yet another object of the embodiments herein is to provide a system and method for identifying the version of an ad played in a TV broadcast stream when the ad has different versions of contents like ads with short length ad and long length.

These and other objects and advantages of the embodiments herein will become readily apparent from the following detailed description taken in conjunction with the accompanying drawings.

SUMMARY

The various embodiments herein provide a system and method for monitoring and detecting Television (TV) ads in real-time using content databases. The method comprises two processes namely an ingest process and a lookup process. The system comprises three databases: a content database, an ingest database and an additional database. The content database stores the audio stream of an ad or commercial which is to be detected in a TV broadcast stream. The ingest database stores the chopped audio stream and/or video stream samples of a TV ad. The additional database stores the whole length of an ingested ad without any chopping.

According to one embodiment herein, a system for monitoring and detecting television advertisements (TV ads) in a television (TV) broadcast stream in real time is disclosed. The system includes a training module and a detection module. The training module is run on a hardware processor in a computing device and is configured to extract audio and video features from a video file of the TV ads. The extracted audio features include fingerprint of a plurality of audio samples and fingerprint of audio of entire video file. The extracted video features include a plurality of frames of the video file at specific intervals. The detection module is run on the hardware processor in the computing device and is configured to monitor and detect the TV ads in a TV broadcast stream in real time. The detection module is configured to detect the TV ads by identifying the start time and the end time of the TV ads in the TV broadcast stream based on fingerprint matching between the fingerprint of the TV broadcast stream and fingerprint of video file extracted by the training module. The detection module is configured to confirm the presence of the TV ads in the TV broadcast stream using a frame to frame comparison between the frames of TV broadcast stream and frames of video file.

According to one embodiment herein, the training module comprises a conversion module, an audio feature extraction module and a video feature extraction module. The conversion module is run on the hardware processor in the computing device and is configured to convert and normalize the video file of the TV ads into a standard format. The conversion module is configured to receive the video file of the TV ads as input. The audio feature extraction module is run on the hardware processor in the computing device and is configured to extract a fingerprint of a plurality of audio samples and fingerprint of audio of entire video file. The audio feature extraction module is configured to chop the video file into a plurality of audio samples of specific duration. The video feature extraction module is run on the hardware processor in the computing device and is configured to extract a plurality of frames from the video file at specific intervals. The plurality of frames extracted is stored in a database after a normalization process.

According to one embodiment herein, the extracted fingerprint of the plurality of audio samples and the entire video is stored in the database.

According to one embodiment herein, the detection module comprises an audio processing module, a video processing module and a report generation module. The audio processing module is run on the hardware processor in the computing device and is configured to identify the start and end times of the TV ads in the TV broadcast stream by performing fingerprint matching. The audio processing module is configured to perform three levels of filtration to identify the start time and end time of the TV ads in the TV broadcast stream. The video processing module is run on the hardware processor in the computing device and is configured to confirm the presence of TV ads in the TV broadcast stream in real time. The video processing module is configured to perform a frame to frame comparison to confirm the presence of television advertisement in the TV broadcast stream. The report generation module is run on the hardware processor in the computing device and is configured to generate reports of the detected television advertisement in real time.

According to one embodiment herein, the audio processing module is configured to perform a fingerprint matching process by matching the fingerprint of the plurality of audio samples with the fingerprint of the audio segments of the video samples of the TV broadcast stream.

According to one embodiment herein, the audio processing module is configured to receive a plurality of video samples of the TV broadcast stream as input from a media station.

According to one embodiment herein, the audio processing module is configured to perform a first level of filtration to short list/choose a set of candidates from a plurality of video samples of the TV broadcast stream. The audio processing module is configured to chop each video sample in the plurality of video samples of the TV broadcast stream into a plurality of audio segments. The audio processing module is configured to generate a fingerprint for each audio segment in the plurality of audio segments. The audio processing module is configured to compare the fingerprint of each audio segment with extracted fingerprint of the plurality of audio samples of each video file stored in the audio database. The audio processing module is configured to shortlist the candidates on identifying a match between the fingerprint of each audio segment with extracted fingerprint of the plurality of audio sample of each video file.

According to one embodiment herein, the audio processing module performs a second level of filtration to finalize the candidates from the set of candidates by matching a fingerprint of audio segments of each candidate with an audio sample of the full length of the video file.

According to one embodiment herein, the audio processing module is configured to perform a third level of filtration to predict a start time and end time of the TV ads by performing a shift search of the final candidates with respect to the audio samples of the TV broadcast stream.

According to one embodiment herein, the audio processing module is configured to communicate with an audio database.

According to one embodiment herein, the video processing module is configured to performs a frame to frame comparison process. The video processing module is configured to chop the video of the TV ads from the video samples of the TV broadcast stream based on the start time and end time. The start time and the end time of the TV ad is received from the audio processing module. The video processing module is configured to receive the plurality of frames of the video file chopped at specific intervals from the database. The video processing module is configured to perform the frame to frame comparison based on standard deviation and similarity between the frames of chopped video and frames of video files. The video processing module is configured to confirm the presence of TV ads in the TV broadcast stream in real time based on the match between the frames of chopped video and frames of video files.

According to one embodiment herein, the video processing module is configured to communicate with a video database.

According to one embodiment herein, a method of monitoring and detecting television advertisements (TV ads) in a television (TV) broadcast stream in real time is disclosed. The method includes extracting audio features from a video file of the TV ad. The extracted audio features include a fingerprint of a plurality of audio samples and a fingerprint of the audio of entire video file. The video features are extracted from the video file of the TV ads. The extracted video features include extracting a plurality of frames of the video file at specific intervals. The extracted audio features and video features of the video file are stored in a database. Each video sample in the plurality of video samples of the TV broadcast stream is chopped into a plurality of audio segments. The fingerprints for each audio segment in the plurality of audio segments are generated. A set of candidates are short-listed by matching the fingerprint of each audio segment with the extracted fingerprint of the plurality of audio sample of each video file. The set of candidates includes a set of video samples of the TV broadcast stream. The candidates from the set of candidates are finalized by matching fingerprint of each candidate with the fingerprint of audio sample of the full length of the video file. The start time and the end time of the TV ad are identified by performing a shift search on finalized candidates with respect to audio samples of the TV broadcast stream. The video of the TV ads from the video samples of the TV broadcast stream is chopped based on the identified start time and end time. The presence of TV ads in the TV broadcast stream is detected in real time by performing a frame to frame comparison between the frames of chopped video and frames of video files.

According to one embodiment herein, a computer implemented method comprising instructions stored on a non-transitory computer readable storage medium and executed on a computing device comprising and a hardware processor and memory for monitoring and detecting television advertisements (TV ads) in a television (TV) broadcast stream in real time is provided. The method comprising steps of extracting audio features from a video file of the TV ads with a training module, and wherein the extracted audio features includes fingerprint of a plurality of audio samples and fingerprint of the audio of entire video file. The video features are extracted from the video file of the TV ads with the training module and wherein the extracted video features includes extracting a plurality of frames of the video file at specific intervals. The extracted audio features and video features of the video file are stored in a database. Each video sample among the plurality of video samples of the TV broadcast stream is chopped into a plurality of audio segments with an audio feature extraction module. The fingerprints for each audio segment among the plurality of audio segments are generated with an audio processing module. A set of candidates are short-listed by matching the fingerprint of each audio segment against extracted fingerprint of the plurality of audio sample of each video file with the audio processing module, and wherein the set of candidates includes a set of video samples of the TV broadcast stream. The candidates are finalized from the set of short-listed candidates by matching fingerprint of each candidate against fingerprint of audio sample of the full length of the video file with the audio processing module. The start time and end time of the TV ad are identified by performing shift search on finalized candidates against audio samples of the TV broadcast stream with the audio processing module. A video of the TV ads is chopped from the video samples of the TV broadcast stream based on the identified start time and end time with a video processing module. The presence of TV ads in the TV broadcast stream is detected in real time by performing frame to frame comparison between frames of chopped video and frames of video files with the video processing module.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
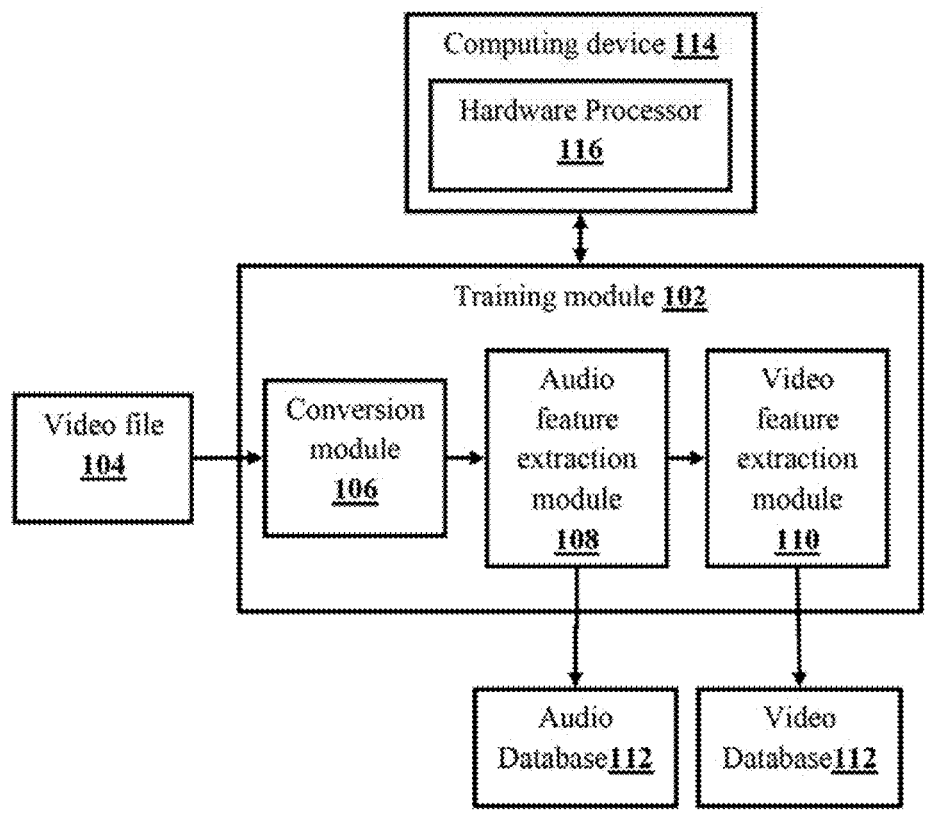
FIG. 1 illustrates a block diagram of a training module performing ingest process for monitoring and detecting TV ads in real time, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for monitoring and detecting Television (TV) ads in real-time using content databases. The method comprises two processes namely an ingest process and a lookup process. The system comprises three databases: a content database, an ingest database and an additional database. The content database stores the audio stream of an ad or commercial which is to be detected in a TV broadcast stream. The ingest database stores the chopped audio stream and/or video stream samples of a TV ad. The additional database stores the whole length of an ingested ad without any chopping.

According to one embodiment herein, a system for monitoring and detecting television advertisements (TV ads) in a television (TV) broadcast stream in real time is disclosed. The system includes a training module and a detection module. The training module is run on a hardware processor in a computing device and is configured to extract audio and video features from a video file of the TV ads. The extracted audio features include fingerprint of a plurality of audio samples and fingerprint of audio of entire video file. The extracted video features include a plurality of flames of the video file at specific intervals. The detection module is run on the hardware processor in the computing device and is configured to monitor and detect the TV ads in a TV broadcast stream in real time. The detection module is configured to detect the TV ads by identifying the start time and the end time of the TV ads in the TV broadcast stream based on fingerprint matching between the fingerprint of the TV broadcast stream and fingerprint of video file extracted by the training module. The detection module is configured to confirm the presence of the TV ads in the TV broadcast stream using a frame to frame comparison between the frames of TV broadcast stream and frames of video file.

According to one embodiment herein, the training module comprises a conversion module, an audio feature extraction module and a video feature extraction module. The conversion module is run on the hardware processor in the computing device and is configured to convert and normalize the video file of the TV ads into a standard format. The conversion module is configured to receive the video file of the TV ads as input. The audio feature extraction module is run on the hardware processor in the computing device and is configured to extract a fingerprint of a plurality of audio samples and fingerprint of audio of entire video file. The audio feature extraction module is configured to chop the video file into a plurality of audio samples of specific duration. The video feature extraction module is run on the hardware processor in the computing device and is configured to extract a plurality of frames from the video file at specific intervals. The plurality of frames extracted is stored in a database after a normalization process.

According to one embodiment herein, the extracted fingerprint of the plurality of audio samples and the entire video is stored in the database.

According to one embodiment herein, the detection module comprises an audio processing module, a video processing module and a report generation module. The audio processing module is run on the hardware processor in the computing device and is configured to identify the start and end times of the TV ads in the TV broadcast stream by performing fingerprint matching. The audio processing module is configured to perform three levels of filtration to identify the start time and end time of the TV ads in the TV broadcast stream. The video processing module is run on the hardware processor in the computing device and is configured to confirm the presence of TV ads in the TV broadcast stream in real time. The video processing module is configured to perform a frame to frame comparison to confirm the presence of television advertisement in the TV broadcast stream. The report generation module is run on the hardware processor in the computing device and is configured to generate reports of the detected television advertisement in real time.

According to one embodiment herein, the audio processing module is configured to perform a fingerprint matching process by matching the fingerprint of the plurality of audio samples with the fingerprint of the audio segments of the video samples of the TV broadcast stream.

According to one embodiment herein, the audio processing module is configured to receive a plurality of video samples of the TV broadcast stream as input from a media station.

According to one embodiment herein, the audio processing module is configured to perform a first level of filtration to short list/choose a set of candidates from a plurality of video samples of the TV broadcast stream. The audio processing module is configured to chop each video sample in the plurality of video samples of the TV broadcast stream into a plurality of audio segments. The audio processing module is configured to generate a fingerprint for each audio segment in the plurality of audio segments. The audio processing module is configured to compare the fingerprint of each audio segment with extracted fingerprint of the plurality of audio samples of each video file stored in the audio database. The audio processing module is configured to shortlist the candidates on identifying a match between the fingerprint of each audio segment with extracted fingerprint of the plurality of audio sample of each video file.

According to one embodiment herein, the audio processing module performs a second level of filtration to finalize the candidates from the set of candidates by matching a fingerprint of audio segments of each candidate with an audio sample of the full length of the video file.

According to one embodiment herein, the audio processing module is configured to perform a third level of filtration to predict a start time and end time of the TV ads by performing a shift search of the final candidates with respect to the audio samples of the TV broadcast stream.

According to one embodiment herein, the audio processing module is configured to communicate with an audio database.

According to one embodiment herein, the video processing module is configured to performs a frame to frame comparison process. The video processing module is configured to chop the video of the TV ads from the video samples of the TV broadcast stream based on the start time and end time. The start time and the end time of the TV ad is received from the audio processing module. The video processing module is configured to receive the plurality of frames of the video file chopped at specific intervals from the database. The video processing module is configured to perform the frame to frame comparison based on standard deviation and similarity between the frames of chopped video and frames of video files. The video processing module is configured to confirm the presence of TV ads in the TV broadcast stream in real time based on the match between the frames of chopped video and frames of video files.

According to one embodiment herein, the video processing module is configured to communicate with a video database.

According to one embodiment herein, a method of monitoring and detecting television advertisements (TV ads) in a television (TV) broadcast stream in real time is disclosed. The method includes extracting audio features from a video file of the TV ad. The extracted audio features include a fingerprint of a plurality of audio samples and a fingerprint of the audio of entire video file. The video features are extracted from the video file of the TV ads. The extracted video features include extracting a plurality of frames of the video file at specific intervals. The extracted audio features and video features of the video file are stored in a database. Each video sample in the plurality of video samples of the TV broadcast stream is chopped into a plurality of audio segments. The fingerprints for each audio segment in the plurality of audio segments are generated. A set of candidates are short-listed by matching the fingerprint of each audio segment with the extracted fingerprint of the plurality of audio sample of each video file. The set of candidates includes a set of video samples of the TV broadcast stream. The candidates from the set of candidates are finalized by matching fingerprint of each candidate with the fingerprint of audio sample of the full length of the video file. The start time and the end time of the TV ad are identified by performing a shift search on finalized candidates with respect to audio samples of the TV broadcast stream. The video of the TV ads from the video samples of the TV broadcast stream is chopped based on the identified start time and end time. The presence of TV ads in the TV broadcast stream is detected in real time by performing a frame to frame comparison between the frames of chopped video and frames of video files.

According to one embodiment herein, a computer implemented method comprising instructions stored on a non-transitory computer readable storage medium and executed on a computing device comprising and a hardware processor and memory for monitoring and detecting television advertisements (TV ads) in a television (TV) broadcast stream in real time is provided. The method comprising steps of extracting audio features from a video file of the TV ads with a training module, and wherein the extracted audio features includes fingerprint of a plurality of audio samples and fingerprint of the audio of entire video file. The video features are extracted from the video file of the TV ads with the training module and wherein the extracted video features includes extracting a plurality of frames of the video file at specific intervals. The extracted audio features and video features of the video file are stored in a database. Each video sample among the plurality of video samples of the TV broadcast stream is chopped into a plurality of audio segments with an audio feature extraction module. The fingerprints for each audio segment among the plurality of audio segments are generated with an audio processing module. A set of candidates are short-listed by matching the fingerprint of each audio segment against extracted fingerprint of the plurality of audio sample of each video file with the audio processing module, and wherein the set of candidates includes a set of video samples of the TV broadcast stream. The candidates are finalized from the set of short-listed candidates by matching fingerprint of each candidate against fingerprint of audio sample of the full length of the video file with the audio processing module. The start time and end time of the TV ad are identified by performing shift search on finalized candidates against audio samples of the TV broadcast stream with the audio processing module. A video of the TV ads is chopped from the video samples of the TV broadcast stream based on the identified start time and end time with a video processing module. The presence of TV ads in the TV broadcast stream is detected in real time by performing frame to frame comparison between frames of chopped video and frames of video files with the video processing module.

The various embodiments herein provide a system and method for monitoring and detecting Television (TV) ads in real-time using content databases. The method comprises two process namely an ingest process and a lookup process. The system comprises three databases including a content database, an ingest database and an additional database. The content database stores the audio stream of an ad or commercial which is to be detected in a TV broadcast stream. The ingest database stores the chopped audio stream samples of an ad. The additional database stores the whole length of an ingested ad without any chopping.

According to one embodiment herein, in the ingest process, the system chops the audio stream of an ad into predetermined timeframe samples and stores the chopped samples in the ingest database. According to one embodiment of the embodiments herein, the system chops the audio stream into samples of 20 seconds with an overlap samples of 10 seconds. For example, the length of an ad 'A' is 40 seconds. The system chops the ad 'A' into three samples A1, A2, and A3 of equal length with a 50% overlap, i.e. A1 has 0-20 s, A2 has 10-30 s and A3 has 20-40 s. The chopped samples A1, A2, and A3 are stored in the ingest database.

According to one embodiment herein, in the lookup process, the system chops a TV broadcast stream of predefined length into samples of predetermined timeframes. According to one embodiment of the embodiments herein, the length of the TV broadcast is chosen to be twice as that of the length of longest ad expected. The stream is chopped to a predetermined small lengths. Each sample will have an overlap of 50% of the length, with the previous sample. For example, if the longest ad is 30 s, then the TV broadcast stream is selected to be 1 min. It is further chopped into samples of 10 seconds with an overlap samples of 5 seconds. Each 1 min stream has an overlap of 30 s with previous 1 min sample.

According to one embodiment herein, the system compares the chopped TV broadcast samples with the audio stream samples stored in the ingest database. Later, the system calculates threshold value for each candidate and continues to search for every possibility match until a matching threshold is reached. According to one embodiment herein, when the threshold of a candidate is above than the average value, the system shortlists the candidate for further filtrations. As the system compares each and every possibility match, the ads having silence during the play is also detected without any fail. Finally, the system prepares a list of candidates eligible for further filtrations. This is called as 'First level filtration'.

According to one embodiment herein, in the second level of filtration, the system considers shortlisted candidates and compares whole length of TV broadcast samples (without chopping) with the ad contents stored in additional database. The additional database contains the original ad without any chopping. For example, the length of an ad is seconds. The whole length of the ad (30 seconds) is compared with 1 min TV broadcast stream. When an ad exactly matches with the TV broadcast stream, the system estimates the boundaries (such as start time and end time, date on which the ad is aired, TV channel name) of the ad and records the information for future use.

According to one embodiment herein, in the third level of filtration, the system considers each shortlisted ad sample and performs a shifted search with the TV broadcast sample. According to one embodiment herein, the system performs shifted search on all versions of the ads when the ad has different versions of contents like short and long ads. Further, the system compares each and every part of the ad sample with the TV broadcast samples and calculates matching threshold value for each version of the ad. The ad version having maximum threshold value is considered as the version of the ad played in the TV channel.

FIG. 1 illustrates a functional block diagram of a training module performing ingest process for monitoring and detecting TV ads in real time, according to one embodiment herein. The training module 102 is configured to perform ingest process while monitoring and detecting the TV ads in real time. The training module 102 is run on a hardware processor and is configured to extract audio and video features from the TV ads. The training module 102 receives TV ads in the form of a video file 104. The training module 102 comprises a conversion module 106, an audio features extraction module 108, and a video features extraction module 110. The training module 102 communicates with a computing device 114 comprises a hardware processor 116. The conversion module 106, the audio features extraction module 108, and the video features extraction module 110 of the training module is run on the hardware processor 116 in the computing device 114.

The conversion module 106 converts the video file 104 of the TV ad into a standard format. Further, the conversion module 106 normalizes the video file in the standard format. The conversion module provides the normalized video file 104 in the standard format to the training module 102. The audio feature extraction module 108 extracts the audio features of the video file 104. The output of the conversion module 106 is provided into the audio feature extraction module 108. The audio feature extraction module 108 extracts the audio fingerprints from the video file 104. The audio feature extraction module 108 extracts two different types of audio fingerprints.

A first type of the audio fingerprint extracted by the audio feature extraction module 108 includes fingerprint of a chopped version of the video file 104. The audio feature extraction module 108 chops the video file 104 in the standard format into a plurality of audio samples of specific duration. Each consecutive audio sample of the video file 104 overlaps with each other. The duration/length of overlap is predefined in the audio feature extraction module 108. The audio feature extraction module 108 further extracts the fingerprint of each audio sample among the plurality audio samples. Further, the audio feature extraction module 108 stores the extracted fingerprint of each audio sample in a database 112. A second type of audio fingerprint extracted by the audio feature extraction module 108 includes fingerprint of the entire video file 104. The audio feature extraction module 108 extracts and stores the fingerprint of the entire video file 104 in the database 112.

Further, the video features extraction module 110 extract video features of the video file 104. The video features extraction module 110 extracts a plurality of frames from the video file 104 at specific intervals. The plurality of frames extracted is stored in the database 112 after a normalization process.

Figure 2:
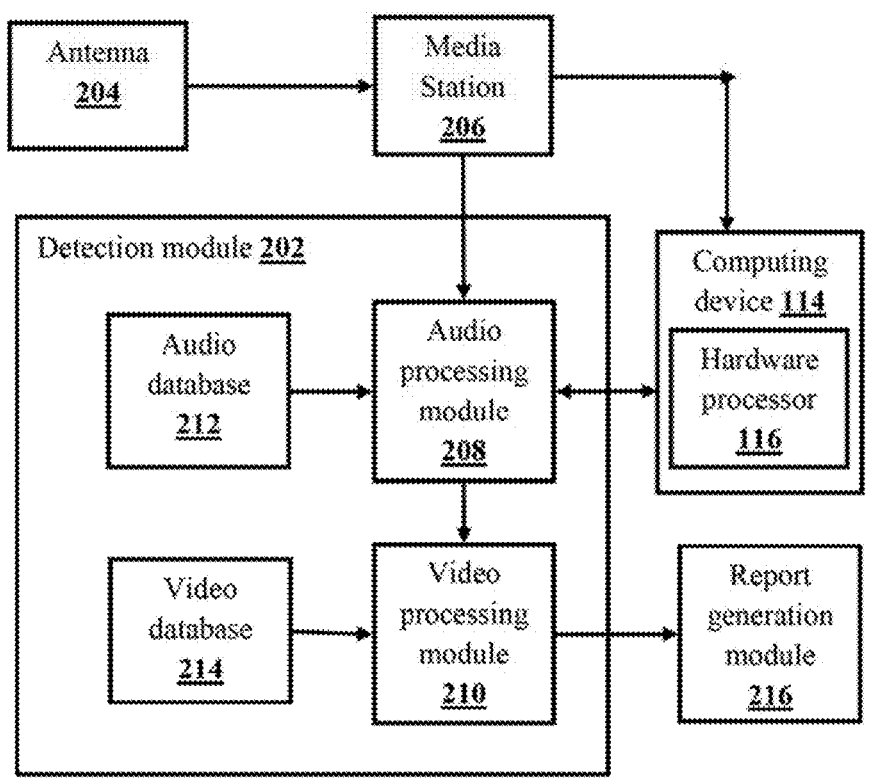
FIG. 2 illustrates a block diagram of a detection module performing lookup process for monitoring and detecting TV ads in real time, according to one embodiment herein.

FIG. 2 illustrates a functional block diagram of a detection module performing lookup process for monitoring and detecting TV ads in real time, according to one embodiment herein. The detection module 202 is configured to detect TV ads in a TV broadcast stream played in a television and generate reports regarding the TV ads played. The TV broadcast stream from an antenna 204 is fed into a media station 206. The media station 206 communicates with a computing device 114 comprising a hardware processor 116. The media station 206 is run on the hardware processor in the computing device 114.

The media station 206 captures the TV broadcast stream of each channel and provides a plurality of video samples of TV broadcast stream into the detecting module 202. The media station 206 chops the incoming TV broadcast stream into a plurality of video samples of specified length. Each consecutive video sample among the plurality of video samples overlap with each other. The overlap of each consecutive video samples is equal to half of the duration of the video sample. Further, the media station 206 marks each video sample with timestamp at which the video sample is recorded. The media station 206 also marks the channel identification number and duration of the video sample. Further, the media station converts the plurality of video samples into a standard format to perform normalization. The normalized video sample is provided to the detection module 202 for detecting TV ads.

The detection module 202 comprises an audio processing module 208 and a video processing module 210. The audio processing module 208 and the video processing module 210 are configured to run on the hardware processor 116 in the computing device 114 for processing the plurality of video samples. The detection module 202 receives the plurality of video samples from the media station 206. Each video sample among the plurality of video samples undergoes four stages of processing within the detection module 202. The output of the detection module 202 is provided to a report generation module 216 for generating reports regarding the detected TV ads.

The audio processing module 208 performs three stages of processing. The audio processing module 208 communicates with an audio database 212. The first stage of processing performed by the audio processing module 208 is a first level filtration. During the first level filtration, the audio processing module 208 initially chops each video sample among the plurality of video samples of the TV broadcast stream into a plurality of audio segments. Further, the audio processing module 208 generates fingerprint for each audio segments among the plurality of audio segments. The first level filtration includes short listing/choosing a set of candidates from the plurality of video samples. The set of candidates refers to a set of video samples among the plurality of video samples of the TV broadcast. The set of candidates includes at least one audio sample of the TV ad that needs to be detected.

The audio processing module 208 further compares the fingerprint of each audio segment with extracted fingerprint of a plurality of audio sample of each video file stored in a search database. The extracted fingerprint of the plurality of audio sample of each video file stored in a database during an ingest process while monitoring and detecting the TV ads. The audio processing module 208 shortlist the set of candidates based on matching between the fingerprint of each segments and extracted fingerprint of the plurality of audio sample of each video file stored in the search database. The set of candidates short listed includes a large number of video samples. However, the number is negligible compared to the number of video samples stored in the database. The set of candidates shortlisted are further eligible for the next levels of filtration.

The second stage of processing performed by the audio processing module 208 is a second level of filtration. The second level of filtration includes finalizing candidates from the set of candidates. The candidates are finalized to eliminate false video samples from the set of candidates. In the second stage, the audio processing module 208 compares audio segments of each candidate against the audio of full length of the video file stored in an additional database. The audio of the video file is the whole length of the ingested TV ad stored in the additional database without any chopping. The candidates are finalized based on the strength of matching between audio segments of each candidate against audio sample of the full length of the video file. Once the candidates are finalized the chances of detecting the TV ads are comparatively high. When a candidate ad exactly matches with the audio sample of the video file, the system estimates the boundaries (such as start and end time, date on which the ad is aired, TV channel name) of the TV ad and records the information for future use.

The third stage of processing performed by the audio processing module 208 is a third level filtration. The third level filtration includes predicting the start and end time of the final candidates. The audio processing module 208 performs a shift search of the finalized candidates. In the third stage, the audio processing module 208 matches each finalized candidate against audio samples of the TV broadcast stream to calculate matching score. The strength of the matching scores for each case is noted. The highest matching score above a threshold value indicates the position of the candidate. The audio processing module 208 calculates the start time and end time based on the case with highest matching score.

The fourth stage of processing is performed by the video processing module 210. The fourth stage of processing includes confirming the video samples from the finalized set of candidates. The audio processing module 208 provides the start and end time of the video samples. The video processing module 210 chops video of the TV ad from the video samples of the TV broadcast stream based on the start and end time. Further, the video processing module 210 performs video normalizing for each video file received. The video processing module 210 communicates with a video database 214. The video database 214 stores a plurality of frames of the video file chopped at specific intervals during ingest process.

Further, the video processing module 210 performs a frame to frame comparison of the video chopped from the TV broadcast stream with the video files received from the video database 214. The video processing module 210 performs frame to frame comparison based on standard deviation and similarity between the frames of video and frames of video files. The video processing module 210 calculates a similarity score based on the similarity between the frames and a deviation score based on the deviation between the frames. The video processing module 210 marks frames of image having the similarity score higher than a similarity threshold and the deviation score lower than a deviation threshold as matched.

Further, the video processing module 210 applies optimization while performing frame to frame comparison. Instead of matching all the frames, the video processing module 210 selects few important frames. The selected frames are compared with frames of video files. The video samples are marked detected if the selected frames are detected during frame to frame comparison. Further, the video processing module 210 also performs frame to frame comparison to identify whether the TV advertisement is played completely. The identification is done if any frames are found missing while performing frame to frame matching.

Further, the report generation module 216 generates reports based on the detected video file. The report includes the TV ads played in the TV broadcast stream and starts and end time of airing the TV ads in the TV broadcast stream. Further, the system enables detection of silent TV ads. The silent TV ads are detected in the same process as normal TV ads. The silent ads in the TV broadcast stream pass the first level filtration, second level filtration and the third level filtration performed by the audio processing module 208. The audio processing module 208 initially compares the finger print of the chopped audio segments of the silent TV ads. A few audio segments of the ad comprises good quality audio required for detection. For examples, the silent ads may include audio for some duration such as announcement of the brand. Further, the fingerprint match is performed against the audio samples of TV broadcast stream. Thus the system confirms the presence of the silent ad.

Further, the video processing module 210 performs frame to frame comparison irrespective of the audio in the silent TV ad. Thus the system enables efficient detection of silent ads. Once the silent ad is detected. The report generation module reports the presence of the silent ad and start and end time of the silent ad.

Figure 3:
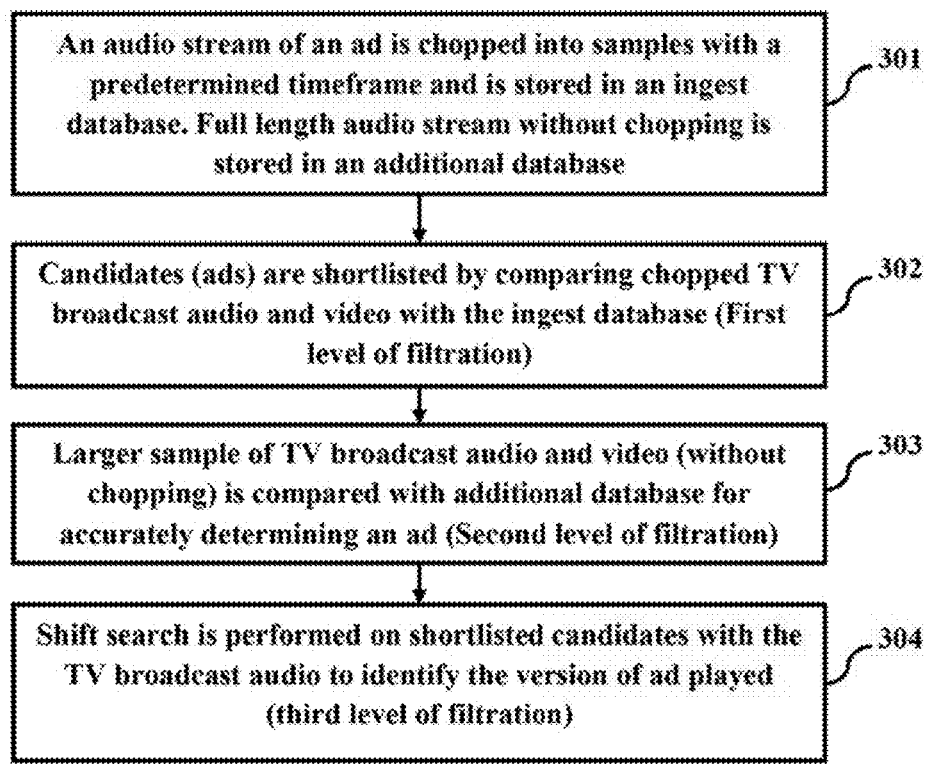
FIG. 3 illustrates a flow chart explaining a method for monitoring and detecting TV ads in real time using content databases, according to one embodiment herein.

FIG. 3 illustrates a flow chart explaining a method for monitoring and detecting TV ads in real time using content databases, according to one embodiment herein. The method comprises two sections namely an ingest process and a lookup process.

In the ingest process, the system chops the audio stream and a video stream of an ad into predetermined timeframe samples and stores the chopped samples in the ingest database. The method further includes storing the entire length of the audio stream and video stream without chopping in an additional database (301).

According to one embodiment herein, the audio stream and video stream are chopped into samples of 20 seconds with an overlap samples of 10 seconds. For example, the length of an ad 'A' is 40 seconds. The system chops the ad 'A' into three samples A1, A2, and A3 of equal length with a 50% overlap, i.e. A1 is 0-20 s, A2 is 10-30 s and A3 is 20-40 s. The chopped samples A1, A2, and A3 are stored in the ingest database.

In the lookup process, the system chops a TV broadcast stream of predetermined length into samples of predetermined timeframes. According to one embodiment herein, the length of the TV broadcast is chosen to be twice as that of the length of longest ad expected. The stream is chopped to predetermine small lengths. Each sample will have an overlap of 50% of the length, with the previous sample. For example, if the longest ad is 30 s, then the TV broadcast stream is selected to be 1 min. It is further chopped into samples of 10 seconds with an overlap sample of 5 seconds. Each 1 min stream has an overlap of 30 s with previous 1 min sample.

Further, the system compares the chopped TV broadcast samples with the audio stream samples and the video stream samples stored in the ingest database. Later, the system calculates threshold value for each candidate and continues to search for every possibility match until a matching threshold is reached. According to one embodiment herein, when the threshold of a candidate is above than the average value, the system shortlists the candidate for further filtrations (302). As the system compares each and every possibility match, the ads having silence during the play is also detected without any fail. Finally, the system prepares a list of candidates eligible for further filtrations. This is called as 'First level filtration'.

In the second level of filtration, the system considers shortlisted candidates and compares whole length of TV broadcast samples (without chopping) with the ad contents stored in additional database (303). The additional database contains the original ad without any chopping. For example, the length of an ad is 30 seconds. The whole length of the ad (30 seconds) is compared with 1 min TV broadcast stream.

According to one embodiment herein, when an ad exactly matches with the TV broadcast stream, the system detects the boundaries (such as start time and end time, date on which the ad is aired, TV channel name) of the ad and records the information for future use.

According to one embodiment herein, in the third level of filtration, the system considers each shortlisted ad sample and performs a shifted search with the TV broadcast sample. According to one embodiment herein, the system performs shifted search on all versions of the ads when the ad has different versions of contents like short and long ads. Further, the system compares each and every part of the ad sample with the TV broadcast samples and calculates matching threshold value for each version of the ad. The ad version having maximum threshold value is considered as the version of the ad played in the TV channel (304).

The embodiments herein provides an effective system and a method for detecting an ad in a TV broadcast stream even when parts of ad contain silence during its play in the TV channels. The system and the method accurately detect TV ads from multiple TV broadcast stream without any error. The embodiments herein also identifies the version of an ad played in a TV broadcast stream in real-time when the ad has different versions like short length and long length ads.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

What is claimed is:

1. A system for monitoring and detecting television advertisements (TV ads) in real time, the system comprises;

a training module run on a hardware processor in a computing device and configured to extract audio and video features from a video file of the TV ads, and wherein the training module is configured to receive TV ads in a form of video file, and wherein the training module comprises a conversion module, an audio features extraction module and a video features extraction module, and wherein the audio features extraction module is configured to extract audio features including a fingerprint of a plurality of audio samples and an audio of entire video file, and wherein the video features extraction module configured to extract video features including a plurality of frames of the video file at specific intervals, and wherein the audio feature extraction module is configured to extract two different types of audio finger prints, and wherein a first type of audio finger print includes a finger print of a chopped version of the video file, and wherein the second type of audio finger print includes a finger print of the entire video file; and a detection module run on the hardware processor in the computing device and configured to monitor and detect the TV ads in a TV broadcast stream in real time, and wherein the detection module comprises an audio processing module and a video processing module, and wherein the audio processing module is configured to detect the TV ads by identifying a start time and an end time of the TV ads in the TV broadcast stream based on a fingerprint matching between a fingerprint of the TV broadcast stream and the fingerprint of video file extracted by the training module, and wherein the video processing module is configured to confirm a presence of the TV ads in the TV broadcast stream by performing a frame to frame comparison between the frames of TV broadcast stream and the frames of video file, and wherein the audio processing module is configured to perform a three levels of filtration to identify the start and end times of the TV ads in the TV broadcast stream, and wherein the audio processing module is configured to perform a first level of filtration to short list/choose a set of candidates from a plurality of video samples of the TV broadcast stream, wherein the audio processing module is configured to perform a second level of filtration to finalize the candidates from the set of candidates by matching the fingerprint of audio segments of each candidate with the audio sample of the full length of the video file to eliminate a false video samples from the set of candidates, wherein the audio processing module is configured to perform a third level of filtration to predict a start time and end time of the TV ads by performing a shift search of the final candidates with respect to the audio samples of the TV broadcast stream, and wherein the audio processing module configured to detect silent ads by performing finger print matching of chopped audio segments with audio samples of TV broadcast stream.

2. The system according too claim 1, wherein the conversion module is run on the hardware processor in the computing device and configured to convert and normalize the video file of the TV ads into a standard format, and wherein the audio feature extraction module is run on the hardware processor in the computing device and configured to extract a fingerprint of a plurality of audio samples and a fingerprint of audio of entire video file, and wherein the audio feature extraction module is configured to chop the video file into a plurality of audio samples of specific or preset duration, and the video feature extraction module is run on the hardware in the computing device processor and configured to extract a plurality of frames from the video file at specific intervals, and wherein the plurality of frames extracted is stored in a database after a normalization process.

3. The system according to claim 1, wherein the extracted fingerprint of the plurality of audio samples and the entire video are stored in the database.

4. The system according to claim 1, wherein the the audio processing module is run on the hardware processor in the computing device and configured to identify the start time and end time of the TV ads in the TV broadcast stream by performing a fingerprint matching, and the video processing module is run on the hardware processor in the computing device and configured to confirm the presence of TV ads in the TV broadcast stream in real time, and wherein the video processing module is configured to perform a frame to frame comparison to confirm the presence of television ads in the TV broadcast stream, and wherein the report generation module is run on the hardware processor in the computing device and configured to generate reports of the detected television advertisement in real time.

5. The system according to claim 1, wherein the audio processing module is configured to perform the fingerprint matching by matching the fingerprint of a plurality of audio samples with the fingerprint of the audio segments of the video samples of the TV broadcast stream.

6. The system according to claim 1, wherein the audio processing module is configured to receive a plurality of video samples of the TV broadcast stream as input from a media station.

7. The system according to claim 1, wherein the audio processing module is configured to chop each video sample among the plurality of video samples of the TV broadcast stream into a plurality of audio segments, generate a fingerprint for each audio segments among the plurality of audio segments, compare the fingerprint of each audio segment with extracted fingerprint of the plurality of audio sample of each video file stored in the audio database, and shortlist the candidates on identifying a match between the fingerprint of each audio segment with extracted fingerprint of the plurality of audio sample of each video file during a first level filtration process.

8. The system according to claim 1, wherein the video processing module is configured to perform a frame to frame comparison by chopping video of the TV ads from the video samples of the TV broadcast stream based on the start and end time, wherein the start and end time of the TV ad is received from the audio processing module, receiving the plurality of frames of the video file chopped at specific intervals from the video database, performing the frame to frame comparison based on standard deviation and similarity between the frames of chopped video and frames of video files, and confirming the presence of TV ads in the TV broadcast stream in real time based on the match between frames of chopped video and frames of video files.

9. A computer implemented method comprising instructions stored on a non-transitory computer readable storage medium and executed on a computing device comprising and a hardware processor and memory for monitoring and detecting television advertisements (TV ads) in a television (TV) broadcast stream in real time, the method comprising steps of;

- extracting audio features from a video file of the TV ads with a training module, wherein the extracted audio features includes fingerprint of a plurality of audio samples and fingerprint of the audio of entire video file;
- extracting video features from the video file of the TV ads with the training module, wherein the extracted video features includes extracting a plurality of frames of the video file at specific intervals;
- storing the extracted audio features and video features of the video file in a database;
- chopping each video sample among the plurality of video samples of the TV broadcast stream into a plurality of audio segments with an audio feature extraction module;
- generating fingerprints for each audio segment among the plurality of audio segments with an audio processing module;
- short-listing a set of candidates by matching the fingerprint of each audio segment against extracted fingerprint of the plurality of audio sample of each video file with the audio processing module, wherein the set of candidates includes a set of video samples of the TV broadcast stream;
- finalizing candidates from the set of candidates by matching fingerprint of each candidate against fingerprint of audio sample of the full length of the video file with the audio processing module;
- identifying start time and end time of the TV ad by performing shift search on finalized candidates against audio samples of the TV broadcast stream with the audio processing module;
- chopping a video of the TV ads from the video samples of the TV broadcast stream based on the identified start time and end time with a video processing module;
- detecting the presence of TV ads in the TV broadcast stream in real time by performing frame to frame comparison between frames of chopped video and frames of video files with the video processing module,
- wherein the audio processing module is configured to detect silent ads by performing finger print matching of chopped audio segments with audio samples of TV broadcast stream.

* * * * *